(12) United States Patent
Epshetsky

(10) Patent No.: US 8,985,554 B2
(45) Date of Patent: Mar. 24, 2015

(54) SYSTEM AND METHOD FOR LIFTING AND LOWERING OBJECTS

(75) Inventor: Yefim Epshetsky, Schaumburg, IL (US)

(73) Assignee: Aktiebolaget SKF, Gothenburg (SE)

( * ) Notice: Subject to any disclaimer, the term of this patent is extended or adjusted under 35 U.S.C. 154(b) by 820 days.

(21) Appl. No.: 13/222,819

(22) Filed: Aug. 31, 2011

(65) Prior Publication Data

US 2013/0048927 A1    Feb. 28, 2013

(51) Int. Cl.
  *B66F 3/36* (2006.01)
  *B29C 67/00* (2006.01)
  *B25H 1/00* (2006.01)
  *B23Q 1/60* (2006.01)

(52) U.S. Cl.
  CPC ............... *B25H 1/0021* (2013.01); *B23Q 1/60* (2013.01)
  USPC .......................................... 254/104; 264/299

(58) Field of Classification Search
  CPC .. B25H 1/0021; B29C 33/20; B29C 45/1756; B29C 59/02; B22D 17/22; B23Q 1/545; B23Q 1/58; B23Q 1/60; B25B 5/08
  USPC ................. 254/98, 104, 100, 133 R, 134, 2 B
  See application file for complete search history.

(56) References Cited

U.S. PATENT DOCUMENTS

| | | | |
|---|---|---|---|
| 619,304 A * | 2/1899 | Herzog | 254/104 |
| 1,274,554 A * | 8/1918 | Ives | 254/104 |
| 1,499,560 A | 7/1924 | Stangeland | |
| 3,543,903 A | 12/1970 | Lodige | |
| 3,802,818 A | 4/1974 | Watanabe | |
| 4,146,600 A | 3/1979 | Elly | |
| 4,153,405 A | 5/1979 | Elly | |
| 4,382,580 A | 5/1983 | Hellander | |
| 4,524,630 A | 6/1985 | Toth | |
| 4,535,689 A * | 8/1985 | Putkowski | 100/214 |
| 4,537,570 A | 8/1985 | Black | |
| 4,601,648 A | 7/1986 | Amano | |
| 5,427,349 A * | 6/1995 | Obrecht | 254/104 |
| 5,449,148 A * | 9/1995 | McPherson | 254/104 |
| 5,922,264 A | 7/1999 | Shimmell | |
| 6,116,565 A * | 9/2000 | Reinke et al. | 248/562 |
| 6,491,343 B2 * | 12/2002 | Yamazaki | 297/250.1 |
| 6,644,089 B1 * | 11/2003 | Gorgen | 72/452.9 |
| 7,328,879 B1 * | 2/2008 | Plangetis | 248/679 |
| 7,645,411 B2 | 1/2010 | Miyakoshi | |

* cited by examiner

*Primary Examiner* — Lee D Wilson
*Assistant Examiner* — Seahee Yoon
(74) *Attorney, Agent, or Firm* — Mark Ussai; SKF USA Inc. Patent Dept.

(57) ABSTRACT

An apparatus of the present invention is used for movable objects upwardly and downwardly relative to a fixed surface. The apparatus includes a lifting device presented by a pair of blocks movable relative one and the other. A carriage device is supported by the blocks. The carriage device is connected to object to be lifted relative the fixed surface. An actuator is connected to the blocks. As the actuator moves the blocks relative one and the other, the blocks move above the carriage device relative the fixed surface at various distances lift and lower the objects.

12 Claims, 4 Drawing Sheets

SYSTEM AND METHOD FOR LIFTING AND LOWERING OBJECTS

FIELD OF THE INVENTION

The present invention relates to a system and method for lowering and lifting objects and more particularly to a mechanical device adaptable to be installed on a surface to lift and lower the objects relative the surface.

BACKGROUND OF THE INVENTION

The art of various lifting devices is replete. Numerous devices such as mechanical, electrical, and hydraulic devices are used in various industrial applications that incorporate a shaft carrying various objects such as, for example, cargo, components of machinery, and the like, to move such objects at desired distances. These prior art references are taught by U.S. Pat. Nos. 1,274,554 to Ives, 1,499,560 to Stangeland, 3,543,903 to Lodige, 3,802,818 to Watanabe, 4,146,600 to Elly et al., 4,153,405 to Elly et al., 4,382,580 Hellander, 4,524,630 to Toth, 4,537,570 to Black et al., 4,601,648 to Amano, 5,922,264 to Shimmell, and 7,645,411 to Miyakoshi.

The U.S. Pat. No. 1,274,554 to Ives (the Ives reference) teaches a jacking device for a horizontal shaft that is intended to keep the shaft in a proper alignment for babbetting and is directed to provide alignment of the shaft in relationship to its bearing in order to perform operation with improved exactitude. In particular, the Ives reference teaches a work surface having a pair of blocks with each block presenting a uniform inclined surface. Each block is connected to its independent shaft connected to and supported by the work surface. The independent shafts are operated by a wrench or a spanner. Both blocks are independently movable towards and away from one another thereby forming a nest to hold a shaft and lift the shaft. The mechanical device taught by the Ives reference is subject to malfunction wherein one of the independent shaft may not be rotated or even two independent shafts may fail to be rotated synchronically thereby preventing the shaft to be moved and lowered gradually thereby having offset in travel path of the shaft. The Ives reference also fails to teach any devices connected to the shaft for lifting an object as blocks are moved to and away from one another.

Therefore, an opportunity exists for improved system and method for moving the object smoothly without any potential malfunctions of elements of the system.

There is also an opportunity for improved system for lifting objects that is simple in manufacturing and installation and compact in design to be utilized in various industrial applications.

SUMMARY OF THE INVENTION

An apparatus of the present invention is used for adjusting a device movable upwardly and downwardly relative to a fixed surface. The fixed surface, such as a plate, includes a plurality of tracks defined therein and a pair of inlets to receive a pair of shafts extending therethrough. The shafts are interconnected by a link. The link is pivotably connected to each shaft. The link includes a device presenting a plurality of rollers connected thereto. The apparatus includes a lifting device presented by a first block, i.e. a female element and a second block, i.e. a male element. Both elements include rollers thereby allowing the elements to move relative each other along the tracks. The female element includes a pair of side walls interconnected by a section thereby forming a gate defined between the side walls. Each side wall includes a first inclined surface and a second inclined surface or slope with each of the surfaces defining different angles in relationship to the horizontal plane of the worksurface. An actuator (mechanical, electrical, hydraulic) is connected to the section. A threaded shaft is connected to the actuator and extends through the section. The threaded shaft is connected with a female connector defined in the male element. The male element presents a unitary body designed to be disposed in the gate. Similar to the side walls of the female element, the male element includes a first inclined surface and a second inclined surface or slope with each of the surfaces defining different angles in relationship to the horizontal plane of the worksurface.

In operational mode of the apparatus, the actuator rotates the shaft which meshingly (mechanically) engages the male element. As the male element enters the gate defined by the side walls, the rollers of the engaging surface are captured by a V-shaped seat defined by the second inclined surface or slope of the male element and the second inclined surface or slope of the female element. As the male element enters the gate of the female element, the rollers slide upwardly over the slopes thereby raising the shafts above the worksurface. As the male element is moved out of the gate of the female element, the rollers slide downwardly over the slopes thereby lowering the shafts relative the worksurface.

An advantage of the present invention is to provide the improved system and method including a unique mechanism adaptable for moving the object smoothly without any potential malfunctions of elements of the mechanism and eliminating any potential offset as the elements of the mechanisms working in accord with one another.

Another advantage of the present invention is to provide the improved system and method for lifting and lowering the objects, wherein the mechanism for performing the same is simple in manufacturing and installation and reduces part count thereby providing the system that is cost effective.

Still another advantage of the present invention is to provide the improved mechanism for lifting and lowering the object that is compact in design and can be utilized in various industrial applications.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
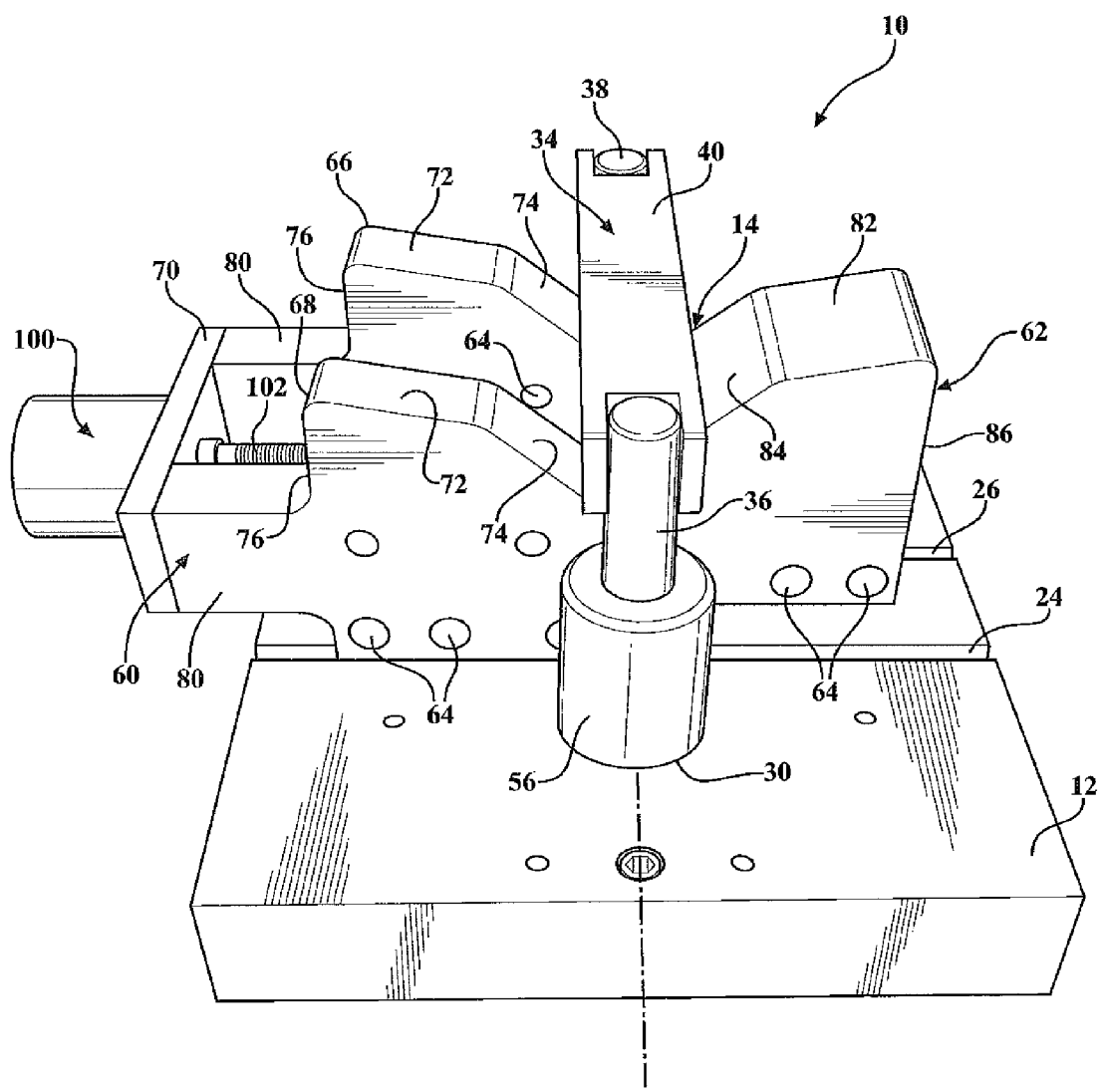
FIG. 1 illustrates a perspective view of a lifting mechanism of the present invention.
Figure 2:
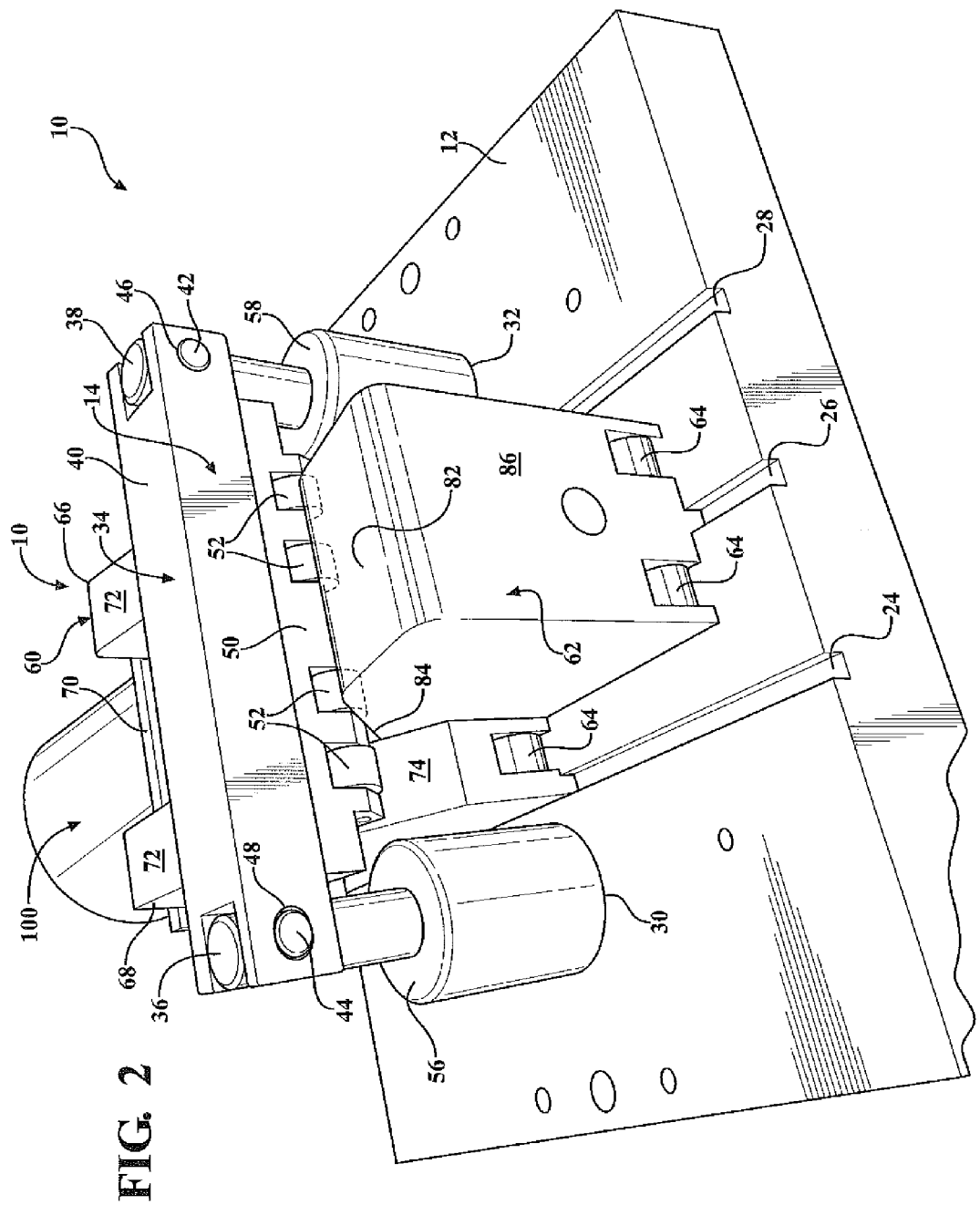
FIG. 2 illustrates another perspective view of the lifting mechanism taken from a side.

Referring to FIGS. 1 through 5, wherein like numerals indicate like or corresponding parts throughout the several views, an apparatus for moving various objects upwardly and downwardly relative to a worksurface, such as a plate or support surface is generally shown at 10. The worksurface is shown at 12 in FIGS. 1 through 4. More particularly, the present inventive concept (as will be described in details further below) relates to a mechanism, generally indicated at 14, that holds an assembly, such as for example, a mold or any other object (not shown), and moves the assembly to and from the worksurface 12. The mechanism 14 is not limited to lifting and lowering of the molds and can be utilized in any industrial applications that require lifting of objects and loads of any kind without limiting the scope of the present invention.

The apparatus 10 includes a lifting device presented a pair of elements, such as a first block, i.e. a female element, generally indicated at 60, and a second block, i.e. a male element, generally indicated at 62. Both elements 60 and 62 include rollers 64 thereby allowing the elements 60 and 62 to move relative each other along the tracks 24, 26, and 28. The female element 60 includes a pair of side walls 66, 68 interconnected by a plate or a section 70 thereby forming a gate defined between the side walls 66, 68 to receive the male element 62. In addition., the female element 60 includes respective front walls 77 of each side walls 66, 68. The male element 62 includes a front wall 87.

Alluding to the above, each shaft 36 and 38 includes respective locking elements (not shown) to engage the mold or other object. The configuration and design of the locking elements is not intended to limit the scope of the present invention. The link 40 includes a device 50 or an engaging surface is connected to the link 40. The link 40 may also be integrally formed with the device 50. The device 50 presents a plurality of rollers 52 rotatably connected thereto. The functionality and the purpose of the rollers 52 will be described further below. A pair of tubular members 54 and 56 surround the shaft 36 and 38 thereby improving alignment of the shafts 36 and 38 relative the inlets 30 and 32.

The male element 62 presents a unitary body designed to be disposed in the gate defined between the side walls 66 and 68. Similar to the side walls 66 and 68 of the female element 60, the male element 62 include a first inclined surface 82 and a second inclined surface or slope 84, and a back side 86, with each of the surfaces 82 and 84 defining different angles, as shown at A and B in FIG. 3, in relationship to the horizontal plane of the worksurface 12.

Each side wall 66 and 68 of the female element 60 presents an engaging surface defined by a first portion or a first inclined surface 72 and a second portion or a second inclined surface 74 and a back side 76. The back side 76 extends generally perpendicular to the worksurface 12. The first and second portions 72 and 74 present different angles shown at X and Y in FIG. 3, as defined between the first and second portions 72 and 74 and the back side 76 as viewed in a cross section. The back sides 76 of the side walls 66 and 68 include a tail portion 80 extending therefrom and interconnected by the plate 70 to receive the male element 62 as the male and female elements 60 and 62 are movable relative one another thereby moving the carriage device 34 above the worksurface 12.

The male element 62 presents a unitary body designed to be disposed in the gate defined between the side walls 66 and 68. Similar to the side walls 66 and 68 of the female element 60, the male element 62 include a first inclined surface 82 and a second inclined surface or slope 84 with each of the surfaces 82 and 84 defining different angles, as shown at A and B in FIG. 3, in relationship to the horizontal plane of the worksurface 12.

Figure 3:
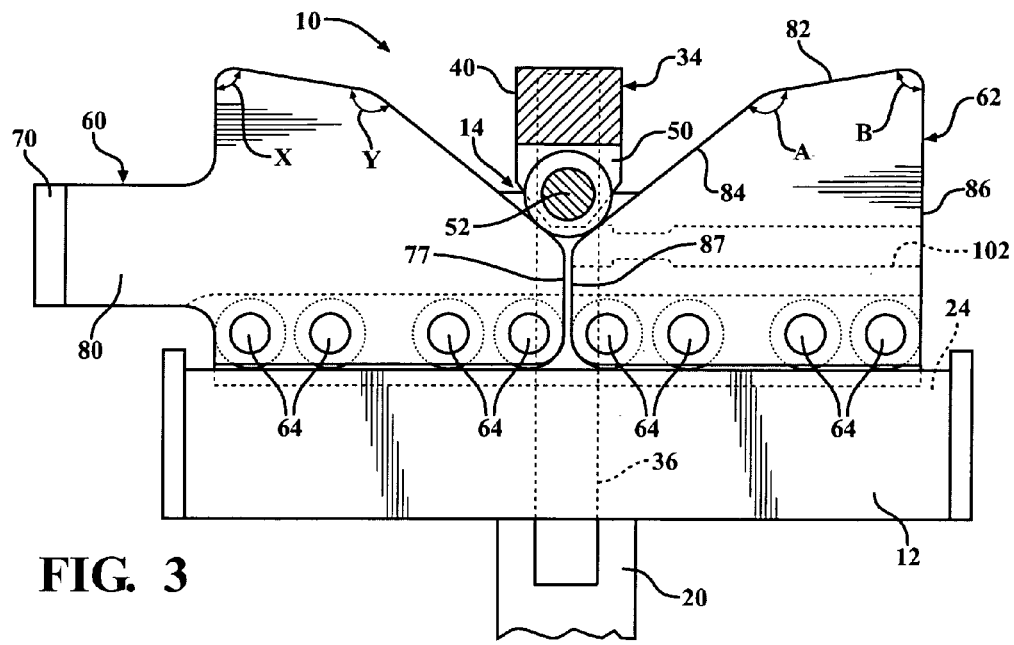
FIG. 3 illustrates a side view of a worksurface with two blocks positioned on the worksurface and a carriage device resting on the blocks.
Figure 4:
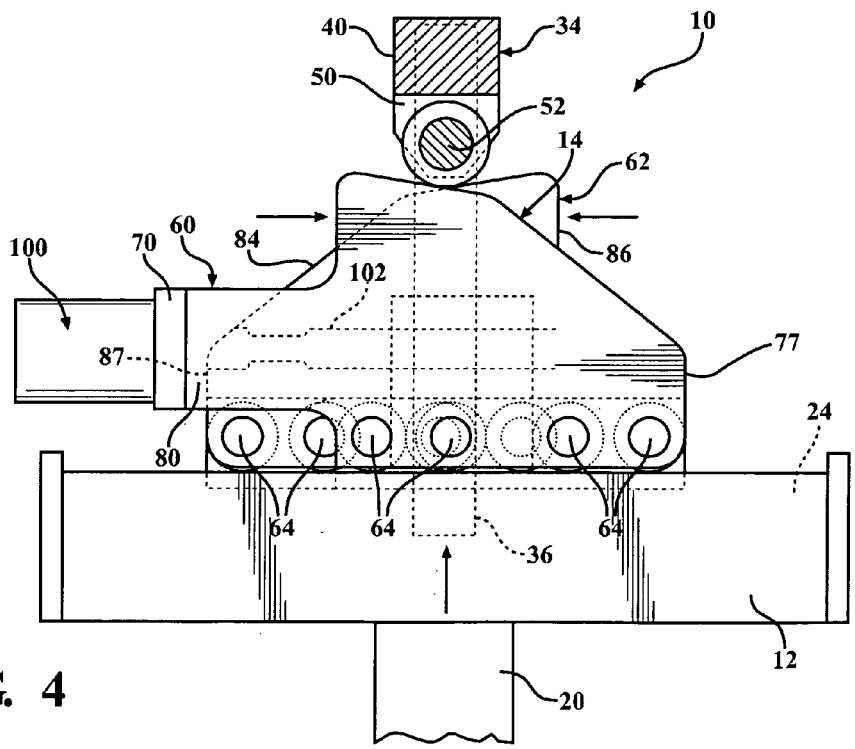
FIG. 4 illustrates another side view of the worksurface with two blocks engaged with one another thereby moving the carriage device above the worksurface at various speeds.
Figure 5:
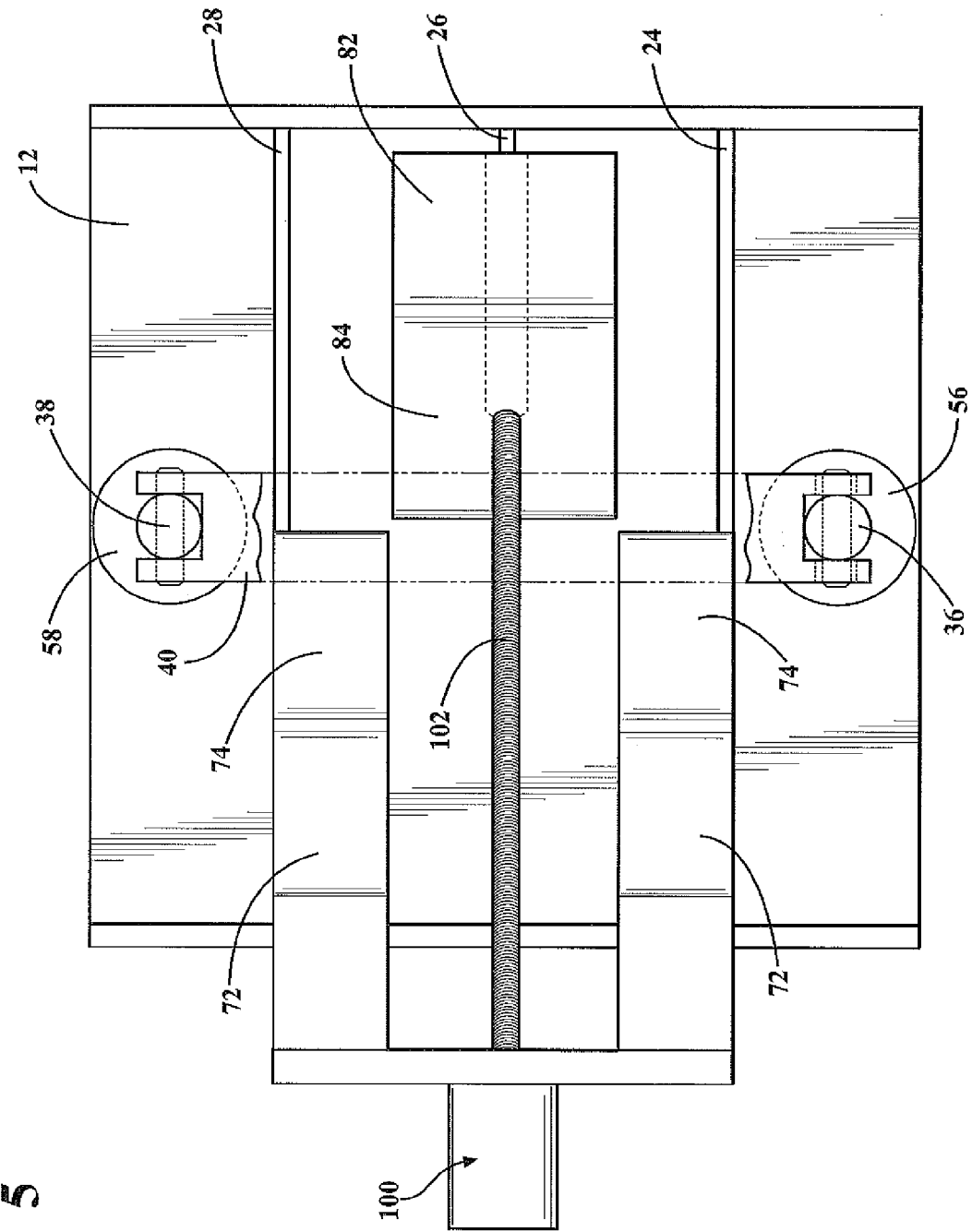
FIG. 5 illustrates a top view of the worksurface with two blocks positioned on the worksurface.

As best shown in FIGS. 3 and 4, the first inclined surface 72 and the second inclined surface 74 of both side walls 66 and 68 and the first inclined surface 82 and the second inclined surface 84 of the male element 62 form a V-shaped seat to receive the carriage device 34. Here, difference between inclinations of the surfaces 72, 74, 82, and 84 will allow the apparatus 10 to lift and lower the carriage device 34 at various speeds. As the rollers 52 slide over the surfaces 74 and 84, with the male element 62 moving into the female element 60 between the side walls 66 and 68, the carriage device 34 is moved at speed higher that speed of the carriage device 34 movable along the surfaces 72 and 82. In other words, the surfaces 74 and 84 are used to move the carriage device 34 at a first speed wherein the surfaces 72 and 82 are used to move the carriage device 34 at a second speed to control the heights of the carriage device 34 relative the worksurface 12 at predetermined positions for simultaneously moving the male and female elements 62 and 60 relative to one another and the center (as shown in phantom on FIG. 1) of the worksurface 12 at equal distances defined between each of the elements 60 and 62 and the center of the worksurface 12 to move the objects relative the worksurface 12.

An adjusting device such as actuator is generally indicated at 100. The actuator 100 is connected to the plate 70 and includes a threaded shaft 102 mechanically engaged and rotatable relative the male element 62. The actuator 100 may include electrical, mechanical, hydraulic designs and the type, size, and configuration of the actuator 100 is not intended to limit the scope of the present invention. The actuator 100 may be cooperable with other components of the apparatus 10 in order to move the female element 60 and the male element 62 relative one another. The apparatus 10 may also include a controller (not shown) connected to the actuator 100 to regulate travel path and time of the carriage device.

In operational mode of the apparatus 10, the actuator 100 rotates the shaft 102 which meshingly (mechanically) engages the male element 62. As the male element 62 enters the gate defined by the side walls 66 and 68, the rollers 52 of the device 50 are captured by the V-shaped seat (best shown on FIG. 3) to receive the carriage device 34. As the male element 62 enters the gate of the female element 60, the rollers 52 slide upwardly over the surfaces 74 and 84 thereby raising the shafts 36 and 38 above the worksurface 12 in order to move the device 34 at a speed higher that the speed of the carriage device 34 movable along the surfaces 72 and 82. Here, the surfaces 74 and 84 are used to move the carriage device 34 at the first speed.

As further shown at FIG. 4, wherein the male element 62 is substantially engaged within the female element 60, the surfaces 72 and 82 are now used to control the heights of the carriage device 34 relative the worksurface 12 thereby fixing the carriage device 34 at a predetermined position as required by various industrial applications wherein the apparatus 10 is used. The actuator 100 operably engaged the male element 62 and the female element 60 allows to move the carriage device 34 at predetermined positions for simultaneously moving the male and female elements 62 and 60 relative to one another and the center of the worksurface 12 at equal distances defined between each of the elements 60 and 62 and the center of the worksurface 12 to move the objects relative the worksurface 12. As the male element 62 is moved out of the gate of the female element 60, the rollers 52 slide downwardly over the surfaces 74 and 84 thereby lowering the shafts 36 and 38 relative the worksurface 12.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for lifting and lowering objects comprising:
    a worksurface defining a central axis;
    a carriage device cooperable with said worksurface for engaging the objects and moving the objects relative said worksurface; and
    a male element and a female element supporting said carriage device and movable relative one another about said central axis, said female element presenting a fast inclined surface and a second inclined surface defining different degrees of inclination, a back side, and a front wall, said male element presenting a first inclined surface and a second inclined surface defining different degrees of inclination, a back side, and a front wall, said second inclined surface of said female element and said second inclined surface of said male element are used to move said carriage device at a first speed and said first inclined surface of said female element and said first inclined surface of said male element are used to move said carriage device at a second speed to control the heights of said carriage device relative said worksurface at predetermined positions for simultaneously moving said male element inside said female element and relative to one another and said central axis at equal distances defined between each of said male element and said female element and said central axis.

2. The apparatus as set forth in claim 1, including an adjusting device defined by an actuator and a threaded shaft extending from and cooperable with said actuator.

3. The apparatus as set forth in claim 2, wherein said carriage device is further defined by a pair of shafts cooperable with said worksurface and a bar element pivotably connected to said shafts and supported by said male element and said female element.

4. The apparatus as set forth in claim 3, wherein said bar element include a device presenting a plurality of rollers with some of said rollers slidably movable on said engaging surface of said first block and the other of said rollers slidably movable on said engaging surface of said second block.

5. A method of lifting and lowering objects relative a worksurface comprising the steps of:
    forming first and second blocks each having a first inclined surface and a second inclined surface defining different degrees of inclination, a back side, and a front wall;
    positioning the first and second blocks on the worksurface to support a carriage device movable relative the worksurface as the first and second blocks slide relative one another thereby moving the carriage device relative the worksurface at variable heights to engage and move the objects relative the worksurface;
    connecting an adjusting device to one of the first and second blocks thereby engaging the other of the first and second blocks; and
    simultaneously moving the first and second blocks relative to one another at equal distances defined between each of the first and second blocks to move the carriage device relative the worksurface at various speeds as the second inclined surface of the first block and the second inclined surface of the second block are used to move the carriage device at a first speed and the first inclined surface of the first block and the first inclined surface of the second block are used to move the carriage device at a second speed to control the heights of the carriage device thereby moving the objects relative the worksurface as the first block enters into the second block and disengages from the second block.

6. The method as set forth in claim 5, wherein the step of connecting the adjusting device to one of the first and second blocks is further defined by connecting an actuator and a threaded shaft to one of the first and second blocks.

7. A The method as set forth in claim 6, including the step of forming the carriage device by a pair of shafts cooperable with the worksurface and a bar element pivotably connected to the shafts and supported by the first and second blocks.

8. A The method as set forth in claim 7, including the step of connecting a plurality of rollers to a bar element with some of the rollers slidably movable on the engaging surface of the first block and the other of the rollers slidably movable on the engaging surface of the second block.

9. An apparatus for lifting and lowering objects comprising:
    a worksurface defining a central axis;
    a carriage device cooperable with said worksurface for engaging the objects and moving the objects relative said worksurface;
    a first block presenting an engaging surface defined by a first portion and a second portion and a back side and a front wall with each of said first and second portions presenting different angles defined between said first and second portions and said back side;
    a second block including a pair of elements each presenting an engaging surface defined by a first portion and a second portion and a back side and a front wall with each of said first and second portions presenting different angles defined between said first and second portions and said back side;
    a tail portion extending from said back sides of each said elements interconnected by a link to form a void to receive said first block as said first and second blocks as movable relative one another with said first block is moved substantially into and between said elements of said second block thereby moving said carriage device; and
    an adjusting device connected to and extending through one of said first and second blocks and engaging the other of said first and second blocks for simultaneously moving said first and second blocks relative to one another and said central axis at equal distances defined between each of said first and second blocks and said central axis for moving said carriage device relative said worksurface thereby moving the objects relative said worksurface.

10. The apparatus as set forth in claim 9, wherein said carriage device is further defined by a pair of shafts cooperable with said worksurface and a bar element pivotably connected to said shafts and supported by said first and second blocks.

11. The apparatus as set forth in claim 10, wherein said bar element presents a device including a plurality of rollers with some of said rollers slidably movable on said engaging surface of said first block and the other of said rollers slidably movable on said engaging surface of said second block.

12. The apparatus as set forth in claim 9, wherein said adjusting device is further defined by an actuator and a threaded shaft extending from and cooperable with said actuator.

* * * * *